(12) United States Patent
Bawa (10) Patent No.: US 12,328,074 B2
(45) Date of Patent: Jun. 10, 2025

(54) CONSTANT-ON-TIME POWER CONVERTER WITH SINGLE-PHASE AND MULTI-PHASE OPERATION

(71) Applicant: Rambus Inc., San Jose, CA (US)

(72) Inventor: Gaurav Bawa, Austin, TX (US)

(73) Assignee: Rambus Inc., San Jose, CA (US)

( * ) Notice: Subject to any disclaimer, the term of this patent is extended or adjusted under 35 U.S.C. 154(b) by 192 days.

(21) Appl. No.: 17/883,360

(22) Filed: Aug. 8, 2022

(65) Prior Publication Data
US 2023/0057588 A1 Feb. 23, 2023

Related U.S. Application Data

(60) Provisional application No. 63/234,553, filed on Aug. 18, 2021.

(51) Int. Cl.
*H02M 3/158* (2006.01)
*H02M 1/00* (2007.01)

(52) U.S. Cl.
CPC ....... *H02M 3/1586* (2021.05); *H02M 1/0003* (2021.05); *H02M 1/0025* (2021.05); *H02M 1/0032* (2021.05)

(58) Field of Classification Search
CPC ............... H02M 1/0032; H02M 3/1584–1586
See application file for complete search history.

(56) References Cited

U.S. PATENT DOCUMENTS

| | | | |
|---|---|---|---|
| 8,710,810 B1 * | 4/2014 | McJimsey | H02M 3/158 323/283 |
| 2008/0169797 A1 | 7/2008 | Zambetti et al. | |
| 2011/0254526 A1 * | 10/2011 | Luo | H02M 3/1584 323/284 |
| 2013/0027009 A1 * | 1/2013 | Tang | H02M 3/158 323/271 |
| 2014/0062433 A1 * | 3/2014 | Zhou | H02M 3/1584 323/271 |
| 2015/0357913 A1 * | 12/2015 | Tschirhart | H02M 3/156 323/282 |

(Continued)

OTHER PUBLICATIONS

Kapat, Santanu et al., "A Tutorial and Review Discussion of Modulation, Control and Tuning of High-Performance DC-DC Converters Based on Small-Signal and Large-Signal Approaches", IEEE Open Journal of Power Electronics, Digital Object Identifier 10.1109/OJPEL.2020.3018311, Sep. 2020. 33 pages.

(Continued)

*Primary Examiner* — Fred E Finch, III
(74) *Attorney, Agent, or Firm* — Womble Bond Dickinson (US) LLP (57) ABSTRACT

A power converter includes a plurality of power stages configured to generate an output current that has an output voltage based on an input current that as an input voltage a control circuit coupled to the plurality of power stages. The control circuit is configured to control operation of the plurality of power stages. The control circuit includes a plurality of constant-on-time loops for the plurality of power stages. The power converter is configured to operate in a single-phase mode or a multiphase mode. A first power stage of the plurality of power stages supports a continuous conduction mode and a discontinuous conduction mode when the power converter operates in the single-phase mode.

13 Claims, 6 Drawing Sheets

(56) References Cited

U.S. PATENT DOCUMENTS

| | | | | |
|---|---|---|---|---|
| 2016/0233766 | A1* | 8/2016 | Todorov | H02M 3/1584 |
| 2018/0054124 | A1* | 2/2018 | Barth | H02M 5/271 |
| 2018/0316255 | A1* | 11/2018 | Tang | H02M 1/084 |
| 2019/0207518 | A1* | 7/2019 | Wu | G01R 29/033 |

OTHER PUBLICATIONS

Liu, Pei-Hsin, "Advanced Control Schemes for High-Bandwidth Multiphase Voltage Regulators", Dissertation, Virginia Polytechnic Institute and State University, Blacksburg, Virginia, https://vtechworks.lib.vt.edu/bitstream/handle/10919/52275/Liu_P_D_2015.pdf?sequence=1, Apr. 7, 2015. 179 pages.

STMicroelectronics NV, "tn1246: Technical Note: Digital Multi-Phase Constant-on-Time Regulator Based on Voltage Controlled Oscillator", STMicroelectronics, DocID030464, Rev. 1, www.st.com, Mar. 2017. 14 pages.

Sun, Ming, "Digital Controlled Multi-Phase Buck Converter with Accurate Voltage and Current Control", Dissertation, Arizona State University, https://repository.asu.edu/attachments/194004/content/Sun_asu_0010E_17397.pdf, Dec. 2017, 76 pages.

* cited by examiner

CONSTANT-ON-TIME POWER CONVERTER WITH SINGLE-PHASE AND MULTI-PHASE OPERATION

CROSS-REFERENCE TO RELATED APPLICATIONS

This application claims the benefit of U.S. Provisional Patent Application No. 63/234,553, filed on Aug. 18, 2021, which is hereby incorporated by reference in its entirety.

BACKGROUND

Electronic or computing devices use electric current to operate or provide power to internal components. These electronic or computing devices often use a specific voltage that may be different from the voltage provided by a power source (e.g., a battery, a wall plug, etc.). A power converter may be used when an electronic or computing device uses a voltage that may be different from the voltage provided by a power source. A power converter may be a circuit or electromechanical device that converts a current (e.g., a direct current) from one voltage to another voltage. The power converter may receive an input current with a first voltage as an input and may generate an output current at a second voltage.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

In the following description, various aspects of the illustrative embodiments will be described using terms commonly employed by those skilled in the art to convey the substance of their work to others skilled in the art. However, it will be apparent to those skilled in the art that the present disclosure may be practiced with only some of the described aspects. For purposes of explanation, specific numbers, materials and configurations are set forth in order to provide a thorough understanding of the illustrative embodiments. In other instances, well-known features are omitted or simplified in order not to obscure the illustrative embodiments.

As discussed above, a power converter may be a circuit or electromechanical device that converts a current (e.g., a direct current) from one voltage to another voltage. The power converter may receive an input current at an input voltage and may generate an output current at an output voltage. A power converter may include multiple power stages that generate the output voltage. For example, the power converter may generate the output voltage using different power stages at different times (e.g., may cycle or interleave through all of the different power stages). When a power converter uses multiple power stages, this may be referred to as operating in multi-phase mode. The power converter may also use a single power stage to generate the output voltage. This may be referred to as operating in single-phase mode. In addition, there are additional modes for the power converter when the power converter operates in single-phase mode. For example, in single phase mode, the power converter may also operate in a continuous conduction mode (CCM) or a discontinuous conduction mode (DCM).

A fixed frequency power converter may operate in multi-phase mode easily, but may have a slower transient response. In addition, when the fixed frequency power converter is in single-phase mode, using DCM may be more problematic in light load conditions. A constant-on-time (COT) power converter may have a faster transient response (when compared to a fixed frequency power converter) and may be able to operate in CCM or DCM more easily (when compared to a fixed frequency power converter). However, multi-phase COT power converters are difficult to implement and may also have difficulties with transient response, even though they may have a faster transient response and may operate with higher power efficiency at light loads by operating in DCM. COT power converters may also have problems maintaining phase interleaving.

The various embodiments, examples, or implementations described herein provide a power converter (e.g., a COT power converter) that is able to operate in both multi-phase mode and single-phase mode. The power converter is also able to operate in CCM and DCM when in single-phase mode. The power converter may have high efficiency across a wide load range, fast transient response, accurate DC regulation, a wide duty cycle range, and may preserve phase interleaving across varying operating conditions.

In one embodiment, power converter is provided. The power converter comprises a plurality of power stages configured to generate an output current (that has an output voltage) based on an input current (that has an input voltage different from the output voltage). The power converter also comprises a control circuit coupled to the plurality of power stages. The control circuit is configured to control operation of the plurality of power stages. The control circuit comprises a plurality of constant-on-time loops for the plurality of power stages. The power converter is configured to operate in a single-phase mode or a multiphase mode. A first power stage of the plurality of power stages supports a continuous conduction mode and a discontinuous conduction mode when the power converter operates in the single-phase mode.

In one embodiment, a power converter is provided. The power converter comprises a means for generating an output current (with a first voltage, an output voltage, etc.) based on an input current (with a second voltage, an input voltage, etc.). The means for generating the output current comprises a plurality of power stages. The power converter also comprises a means for controlling the means for generating the output current. The means for controlling the means for generating the output current comprises a plurality of constant-on-time loops for the plurality of power stages. The power converter is configured to operate in a single-phase mode or a multiphase mode. A first power stage of the plurality of power stages supports a continuous conduction mode and a discontinuous conduction mode when the power converter operates in the single-phase mode.

In one embodiment, a method is provided. The method comprises determining whether to operate a power converter in a single-phase mode or a multiphase mode. The power converter comprises a plurality of power stages configured to generate an output current (with a first voltage, an output voltage, etc.) based on an input current (with a second voltage, an input voltage, etc.), and a control circuit coupled to the plurality of power stages. The control circuit is configured to control operation of the plurality of power stages. The control circuit comprises a plurality of constant-on-time loops for the plurality of power stages. The method also comprises, in response to determining that the power converter should operate in the single-phase mode, generating the output current using a first stage of the plurality of power stages. The first stage supports a continuous conduction mode and a discontinuous conduction mode when the power converter operates in the single-phase mode.

Figure 1:
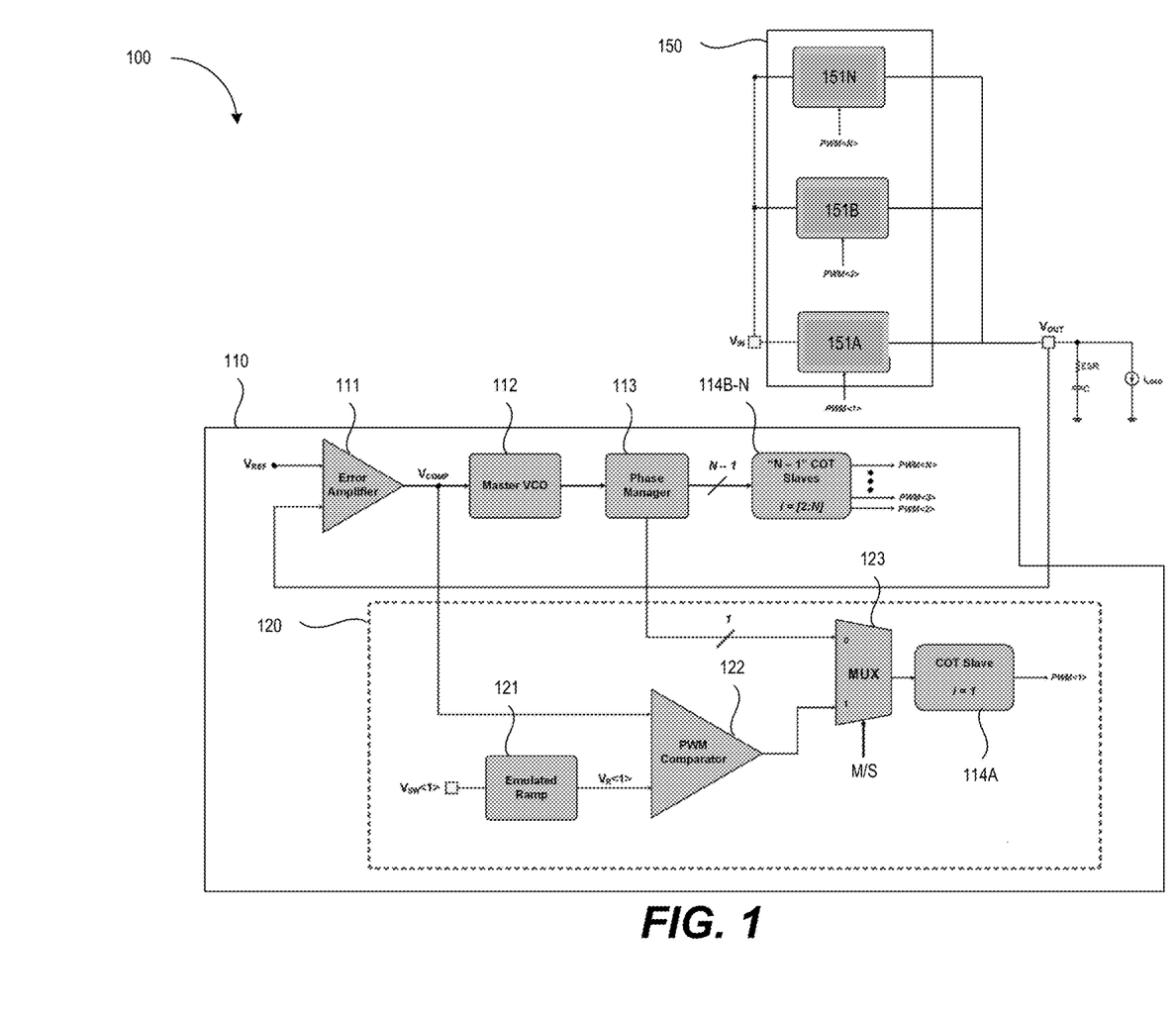
FIG. 1 illustrates a block diagram of an apparatus comprising a power converter to generate an output current based on an input current, according to an embodiment.

FIG. 1 illustrates a block diagram of an apparatus 100 (e.g., a device, a circuit, etc.) comprising a power converter to generate an output current (that has an output voltage or a first voltage) based on an input current (that has an input voltage or a second voltage). As shown in FIG. 1, in one embodiment, the apparatus 100 comprises a control circuit 110 and a set of power stages 150. It should also be understood that the apparatus 100 may include one or more additional or alternative components than those shown in FIG. 1.

As discussed above, the apparatus 100 may be a power converter. In one embodiment, the apparatus 100 may be a direct current to direct current (DC-DC or DC-to-DC) converter. A DC-DC converter may also be referred to as a DC-DC power converter.

In one embodiment, the apparatus 100 may be a boost converter. A boost converter may be a power converter (e.g., a DC-DC converter) that increases voltage from its input (e.g., supply) to its output (e.g., load). In another embodiment, the apparatus 100 may be a buck converter. A buck converter may be a power converter (e.g., a DC-DC converter) that decreases voltage from its input (e.g., supply) to its output (e.g., load). In a further embodiment, the apparatus 100 may be a buck-boost converter. A buck-boost converter may be a power converter (e.g., a DC-DC converter) that is able to bother increase voltage from its input to its output, and decrease voltage from its input to its output.

In one embodiment, the apparatus 100 is able to operate in a single-phase mode. When the apparatus 100 (e.g., a DC-DC converter) operates in the single-phase mode, only one of the set of power stages 150 may generate the output voltage $V_{OUT}$ using the input voltage $V_{IN}$. For example, only power stage 151A may generate the output voltage $V_{OUT}$ when the apparatus 100 operates in the single-phase mode.

In one embodiment, the apparatus 100 is able to operate in a multiphase mode. When the apparatus 100 operates in the multi-phase mode, at least two of the set of power stages 150 may generate the output voltage $V_{OUT}$ using the input voltage $V_{IN}$. For example, two, six, or any other appropriate number of power stages of the set of power stages 150 may be used to generate the output voltage $V_{OUT}$ when the apparatus 100 operates in the multi-phase mode. The individual power stages 151A through 151N may operate a different duty cycles when operating in the multi-phase mode, as discussed in more detail below.

As illustrated in FIG. 1, the apparatus 100 includes a set of power stages 150. The set of power stages 150 may receive an input voltage (e.g., $V_{IN}$) from a supply (e.g., a power source, a power supply, etc.). The set of power stages 150 may generate an output voltage (e.g., $V_{OUT}$) based on the input voltage. The set of power stages 150 include individual power stages 151A through 151N. The number of power stages in the set of power stages 150 may be different in different embodiments. For example, two, ten, seventeen, or any other appropriate number of power stages may be used.

The set of power stages 150 are coupled (e.g., communicatively coupled, directly coupled, indirectly coupled, etc.) to the control circuit 110. In one embodiment, the control circuit 110 may control the operation of the set of power stages 150. The control circuit 110 may control the duty cycle of each of the individual power stages 151A though 151N. For example, the control circuit 110 may control the timing and the switching frequency of each of the individual power stages 151A through 151N (e.g., may interleave or cycle between the power stages 151A through 151N).

As illustrated in FIG. 1, the control circuit 110 includes an amplification circuit 111. The amplification circuit 111 is coupled an output of the set of power stages 150 and may receive the voltage $V_{OUT}$ from the output. The amplification circuit 111 may also be coupled to a reference voltage source and may receive the voltage $V_{REF}$ from the reference voltage source. In one embodiment, the amplification circuit 111 may compare $V_{OUT}$ with $V_{REF}$ to determine whether $V_{OUT}$ is higher or lower than $V_{REF}$. The amplification circuit 111 may output a compensation voltage to a voltage controlled oscillator loop (e.g., a VCO, a VCO loop, a VCO circuit, etc.) based on whether $V_{OUT}$ is higher or lower than $V_{REF}$. For example, the amplification circuit 111 may output one or more bits, pulses, signals, etc., to indicate whether $V_{OUT}$ is higher or lower than $V_{REF}$ and how much higher or lower $V_{OUT}$ is compared to $V_{REF}$. Providing $V_{OUT}$ is to the control circuit 100 allows the control circuit 100 to operation of the of power stages 151A through 151N based on $V_{OUT}$.

Also as illustrated in FIG. 1, the control circuit 110 also includes the VCO loop 112. In one embodiment, the VCO loop 112 may generate a control signal (e.g., a signal that may be used to control the duty cycles of the set of power stages 150). As discussed above, the VCO loop 112 may receive a compensation voltage from the amplification circuit 111 indicating whether $V_{OUT}$ is higher or lower than $V_{REF}$ and how much higher or lower $V_{OUT}$ is compared to $V_{REF}$. The VCO loop 112 may vary the frequency of the control signal based on the compensation voltage received from the amplification circuit. For example, if $V_{OUT}$ is greater than $V_{REF}$, the VCO loop 112 may decrease the frequency of the control signal. If $V_{OUT}$ is less than $V_{REF}$, the VCO loop 112 may increase the frequency of the control signal. The control signal may be provided to a phase management circuit 113.

As further illustrated in FIG. 1, the control circuit 110 includes a phase management circuit 113. In one embodiment, the phase management circuit 113 may control operation for a set of constant-on-time (COT) loops 114A through 114N of the control circuit 110. For example, the phase management circuit 113 may provide, transmit, distribute, etc., the control signal generated by the VCO loop 112 to the different COT loops 114A. Thus, the phase management circuit 113 may interleave between the different COT loops 114A through 114N and the different power stages 151A through 151N. The operation of the COT loops 114A through 114N may be controlled by or based on the control signal. For example, when a COT loop 114A receives the control signal, it may control operation of power stage 151A based on the control signal (e.g., the duty cycle of the power stage 151A may be based on the frequency of the control signal).

In one embodiment, the phase management circuit 113 may distribute the control signal among the different COT loops 114A through 114N based on a schedule. For example, the phase management circuit 113 may interleave or switch between the different power stages 151A through 151N to generate the output voltage $V_{OUT}$. This may be referred to as phase interleaving or stage interleaving. The phase management circuit 113 may use a round robin schedule to distribute the control signal among the different COT loops 114A through 114N. For example, the control signal may be provided to COT loop 114A for a period of time, then to COT loop 114B for the period of time, then to COT loop 114C for the period of time, etc. Various other schedules or interleavings may be used to distribute the control signal among the different COT loops 114A through 114N in other embodiments. For example, the order for distributing the control signal among COT loops 114A through 114N, the amount of time each of the COT loops 114A through 114N receives the control signal, etc., be varied as appropriate in different embodiments.

The control circuit 110 also includes COT loops 114A through 114N. In one embodiment, the COT loops 114A through 114N may control the operation of the power stages 151A through 151N. In particular, each of the COT loops 114A through 114N may control the operation of a respective one of the power stages 151A through 151N. For example, COT loop 114A may control the operation of power stage 151A, COT loop 114B may control the operation of power stage 151B, COT loop 114C may control the operation of power stage 151C, etc. Each of COT loops 114A through 114N may control the duty cycle of a respective power stage by generating a COT control signal based on the control signal received from the phase management circuit 113.

In one embodiment, one of the set of power stages 150 (e.g., a first power stage) may support different modes of operation of operation for the apparatus 100 when the apparatus 100 operates in the single-phase mode. For example, the power stage 151A may support a continuous conduction mode (CCM) when the apparatus 100 operates in the single phase mode. Operating the power stage 151A in CCM may be referred to as operating the apparatus 100 in CCM. In another example, the power stage 151A may support a discontinuous conduction mode (DCM) when the apparatus 100 operates in the single phase mode. Operating the power stage 151A in DCM may be referred to as operating the apparatus 100 in DCM. In another embodiment, the apparatus 100 may transition from CCM to DCM, or vice versa.

The control circuit 110 further includes a first stage circuit 120. In one embodiment, the first stage circuit 120 may control the operation of the first power stage 151A of the set of power stages 150. For example, the first stage circuit 120 may generate a control signal (e.g., a COT control signal) for the first power stage 151A when the apparatus 100 operates in a single-phase mode.

The first stage circuit 120 includes a ramp circuit 121, a comparison circuit 122, a multiplexer 123 and the COT loop 114A. The ramp circuit 121 and the comparison circuit are used control the operation of the power stage 151A when the apparatus 100 operates in the single-phase mode. The signal from the phase management circuit 113 is used to control the operation of the power stage 151A when the apparatus 100 operates in the multi-phase mode. As illustrated in FIG. 1, the multiplexer circuit includes a select input (e.g., M/S). The select input may be used to indicate whether apparatus should operate in a multi-phase mode (e.g., M) or single phase mode (e.g., S). For example, a "1" may represent single-phase mode and a "0" may represent multi-phase mode.

Figure 2:
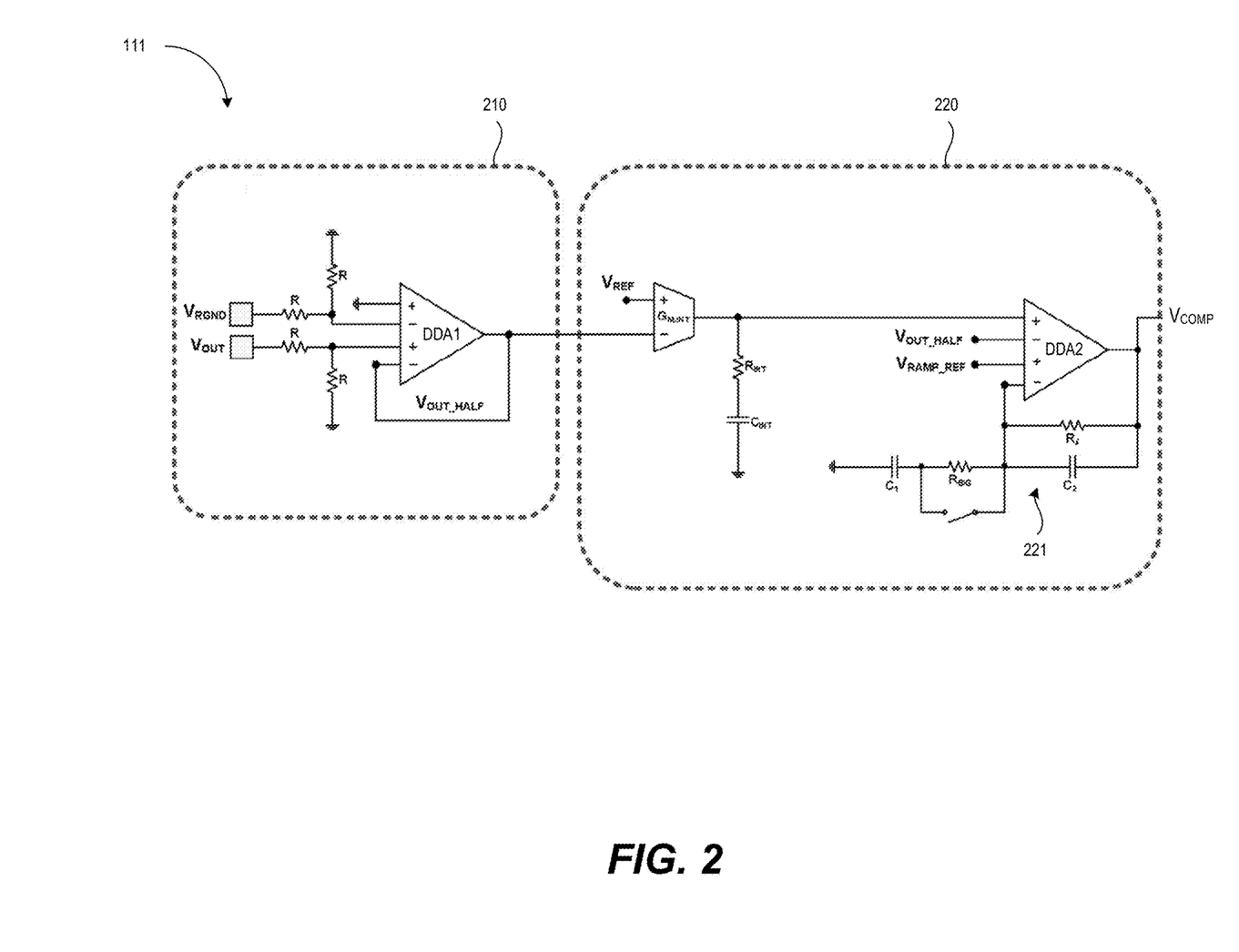
FIG. 2 illustrates the amplification circuit of FIG. 1, according to an embodiment.

FIG. 2 illustrates the amplification circuit 111 of FIG. 1, according to an embodiment. As discussed above, the amplification circuit 111 may compare $V_{OUT}$ (generated by the set of power stages 150) with $V_{REF}$ to determine whether $V_{OUT}$ is higher or lower than $V_{REF}$. The amplification circuit 111 may output a compensation voltage ($V_{COMP}$) (to a voltage controlled oscillator loop) based on whether $V_{OUT}$ is higher or lower than $V_{REF}$. The amplification circuit 111 includes a first portion 210 and a second portion 210.

In one embodiment, the first portion 210 includes a first differential difference amplifier DDA1 and four resistors R. DDA1 may divide down $V_{OUT}$ and provide the resulting divided down voltage ($V_{OUT\_HALF}$) to DDA1. DDA1 may act as a remote sensing amplifier (RSA) and may sense the voltage of $V_{OUT\_HALF}$. The output of DDA1 is coupled to the second portion 220.

The second portion 220 includes an amplifier $G_{M,INT}$ (e.g., a transconductance amplifier), resistors $R_{INT}$, $R_{BIG}$, and $R_2$, a second differential difference amplifier DDA2, and capacitors $C_1$ and $C_2$. The capacitors $C_1$ and $C_2$, and resistors $R_{BIG}$, and $R_2$ may form a filter 221. In one embodiment, filter 221 may be a configurable type II or type III filter. The filter 221 may be used when the apparatus 100 of FIG. 1 operates in the multi-phase mode. For example, a switch may be used to short the resistor $R_{BIG}$ when the apparatus 100 operates in the multi-phase mode which may cause the filter 221 to operate as a type III filter. $G_{M,INT}$ receives the output of DDA1. $G_{M,INT}$ also receives a voltage $V_{REF}$ (e.g., a bandgap voltage). The output of $G_{M,INT}$ is provided to DDA2. $V_{OUT\_HALF}$, $V_{RAMP\_REF}$ are also provided to DDA2. DDA2 may generate the compensation voltage $V_{COMP}$ based on the output of $G_{M,INT}$, $V_{OUT\_HALF}$, and $V_{RAMP\_REF}$. $V_{COMP}$ may be provided to the VCO loop 112 of FIG. 1, as discussed above.

Figure 3:
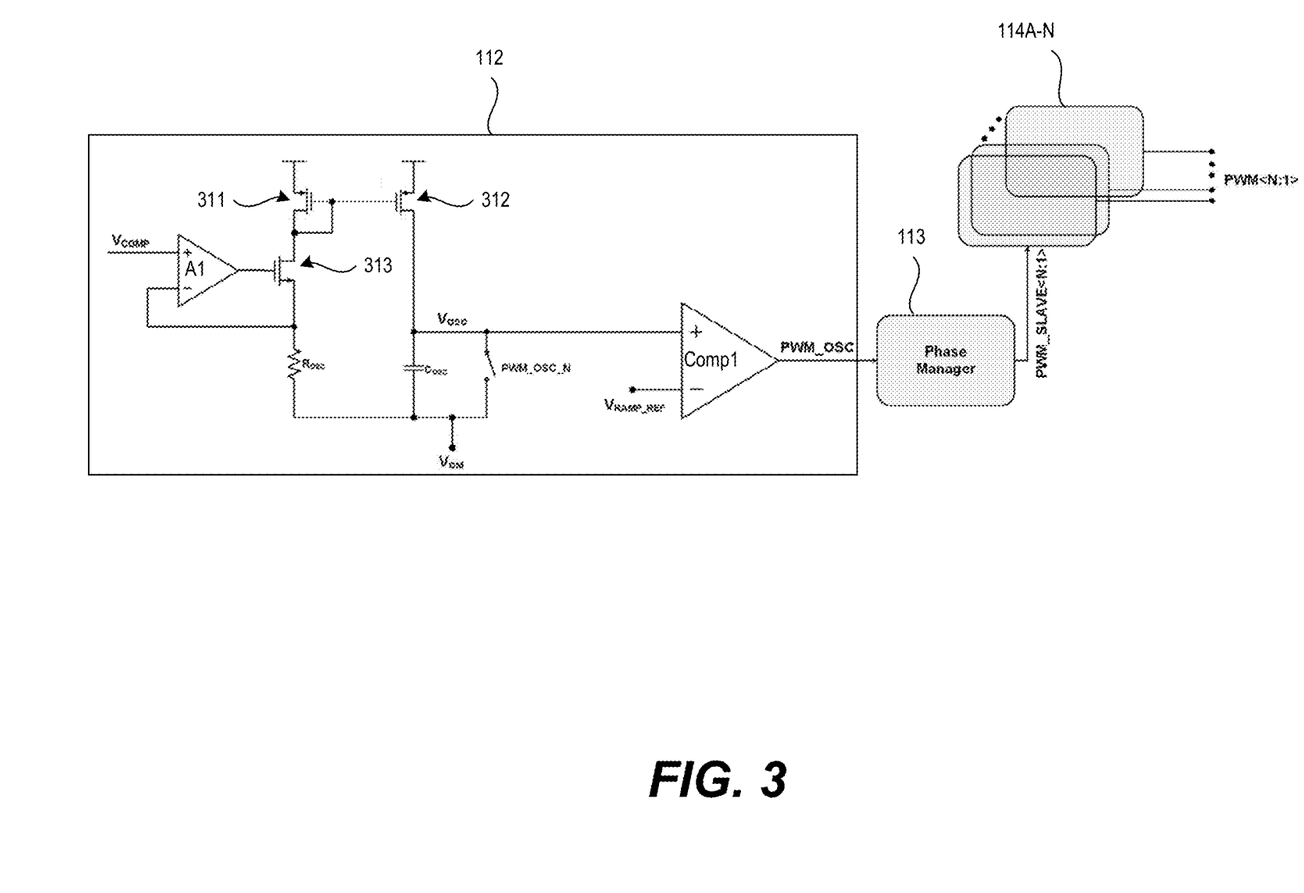
FIG. 3 illustrates the voltage controlled oscillator loop of FIG. 1, according to an embodiment.

FIG. 3 illustrates the voltage controlled oscillator (VCO) loop 112 of FIG. 1, according to an embodiment. VCO loop 112 may generate a control signal PWM_OSC (e.g., a signal or control signal that may be used to control the duty cycles of the set of power stages 150 illustrated in FIG. 1), as discussed above. The VCO loop 112 includes amplifier A1, switches 311, 312, and 313, resistor $R_{OSC}$, capacitor $C_{OSC}$, and a comparison circuit Comp1 (e.g., a comparator). Switches 311, 312, and 313 may be field effect transistors (FETS), such as metal-oxide-semiconductor field-effect transistors (MOSFETS).

As discussed above, the compensation voltage $V_{COMP}$ is received from 111 amplification circuit 111 of FIG. 1. The switches 311, 312, and 313 (e.g., MOSFETS), resistor $R_{OSC}$, and capacitor $C_{OSC}$ are used to generate the voltage $V_{OSC}$. The comparison circuit Comp1 may compare the voltage $V_{OSC}$ with the voltage $V_{RAMP\_REF}$ to generate the control signal PWM_OSC. $V_{RAMP\_REF}$ may be received from a ramp circuit (which is discussed in more detail below). The control signal PWM_OSC may be provided to the phase manager 113 which may distribute the control signal PWM_OSC to the COT loops 114A through 114N (e.g., provide the control signal PWM_OSC to the COT loops 114A through 114N in a round-robin schedule), as discussed above.

Figure 4:
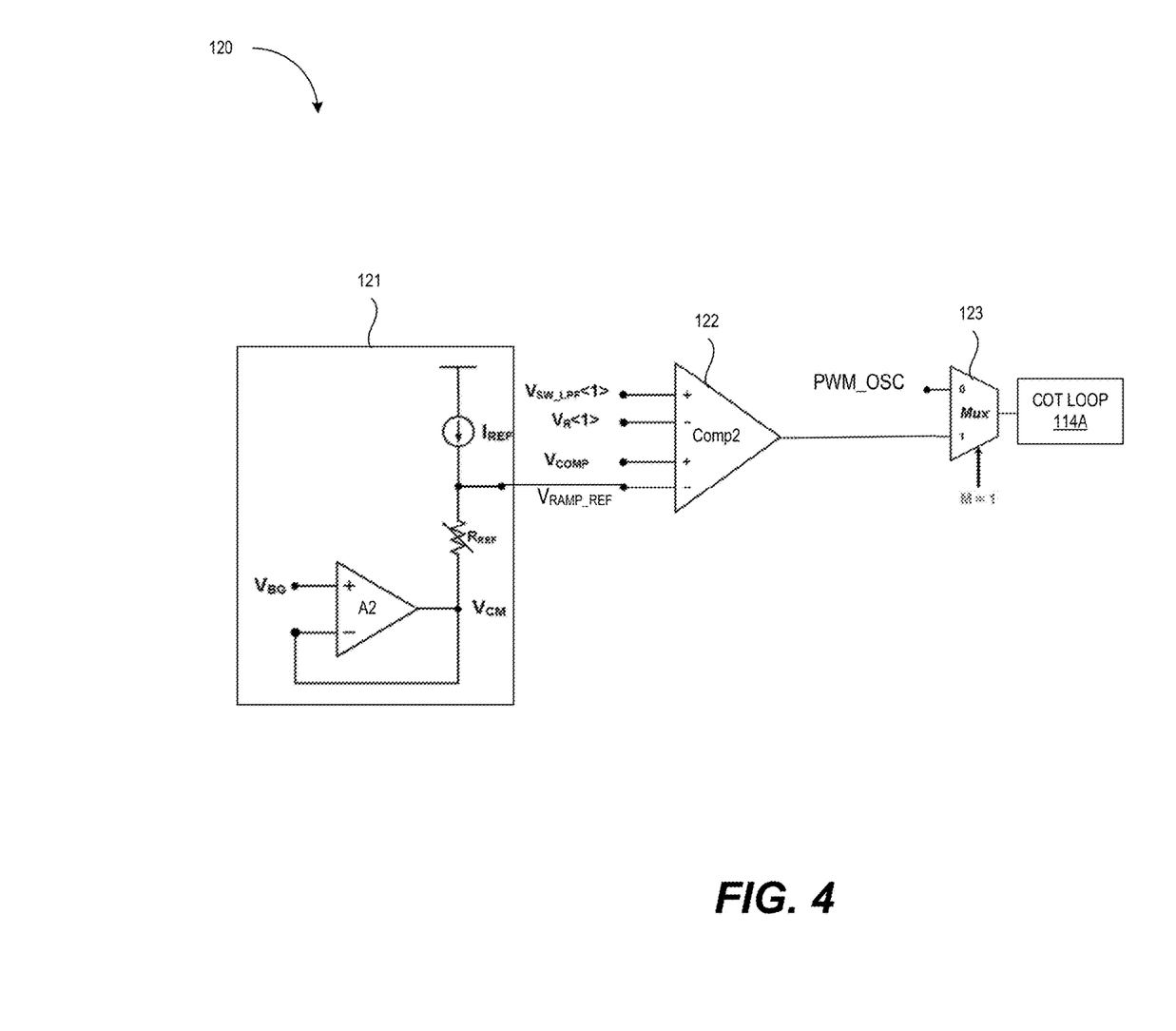
FIG. 4 illustrates the first phase control circuit of FIG. 1, according to an embodiment.

FIG. 4 illustrates the first phase control circuit 120 of FIG. 1, according to an embodiment. As discussed above, the first stage circuit 120 may control the operation of the first power stage 151A of the set of power stages 150, illustrated in FIG. 1. The first stage circuit 120 includes a ramp circuit 121, a comparison circuit 122, a multiplexer circuit 123, and COT loop 114A.

The ramp circuit 121 includes an amplifier A2 and a resistor $R_{REF}$. The amplifier A2 receives a voltage $V_{BG}$ and generates a voltage $V_{CM}$ (which is fed back to the amplifier A2). The ramp circuit 421 uses the voltage $V_{CM}$ and a current $I_{REF}$ to generate the voltage $V_{RAMP\_REF}$. $V_{RAMP\_REF}$ is provided to the comparison circuit 122 (e.g., Comp2). Comparison circuit 122 may compare the voltage received from the first power stage 114A illustrated in FIG. 1 (e.g., $V_{SW\_LPF}<1>$, which may be the same as $V_{OUT}$) with a voltage $V_R<1>$. The voltage $V_R<1>$ may generated based on the voltage generated by the first power stage 114A. For example, the voltage $V_R<1>$ may be generated by using a resistive divider, a voltage divider, etc., on the voltage generated by the first power stage 114A. The comparison circuit 122 may also compare $V_{RAMP\_REF}$ and $V_{COMP}$ (which is received from the amplification circuit 111 illustrated in FIGS. 1 and 2). The output of the comparison circuit 122 may be provided to the multiplexer circuit 123.

In one embodiment, the output of the comparison circuit 122 may be provided (e.g., muxed) to the COT loop 114A when the apparatus 100 operates in a single phase mode. For example, when an input of "1" is provided to the select line/input of the multiplexer circuit 123, this may indicate that the apparatus is operating in a single phase mode (e.g., S) and the output of the comparison circuit 122 should be used by the COT loop 114A. If an input of "0" is provided to the select line/input of the multiplexer circuit 123, this may indicate that the apparatus is operating in a multi-phase mode (e.g., M) and the output of the VCO loop 112 should be used by the COT loop 114A. Thus, the first phase control circuit 120 allows the apparatus 100 (of FIG. 1) to operate in either single-phase mode (which uses the output generated by the ramp circuit 121 and comparison circuit 122 to generate a single-phase control signal for the COT loop 1) or in multi-phase mode (which uses the output generated by the phase management circuit 113.

The ramp circuit 121 further includes the COT loop 114A. The COT loop 114A controls operation of the power stage 151A (illustrated in FIG. 1) based on the control signal (e.g., the duty cycle of the power stage 151A may be based on the frequency of the control signal).

Figure 5:
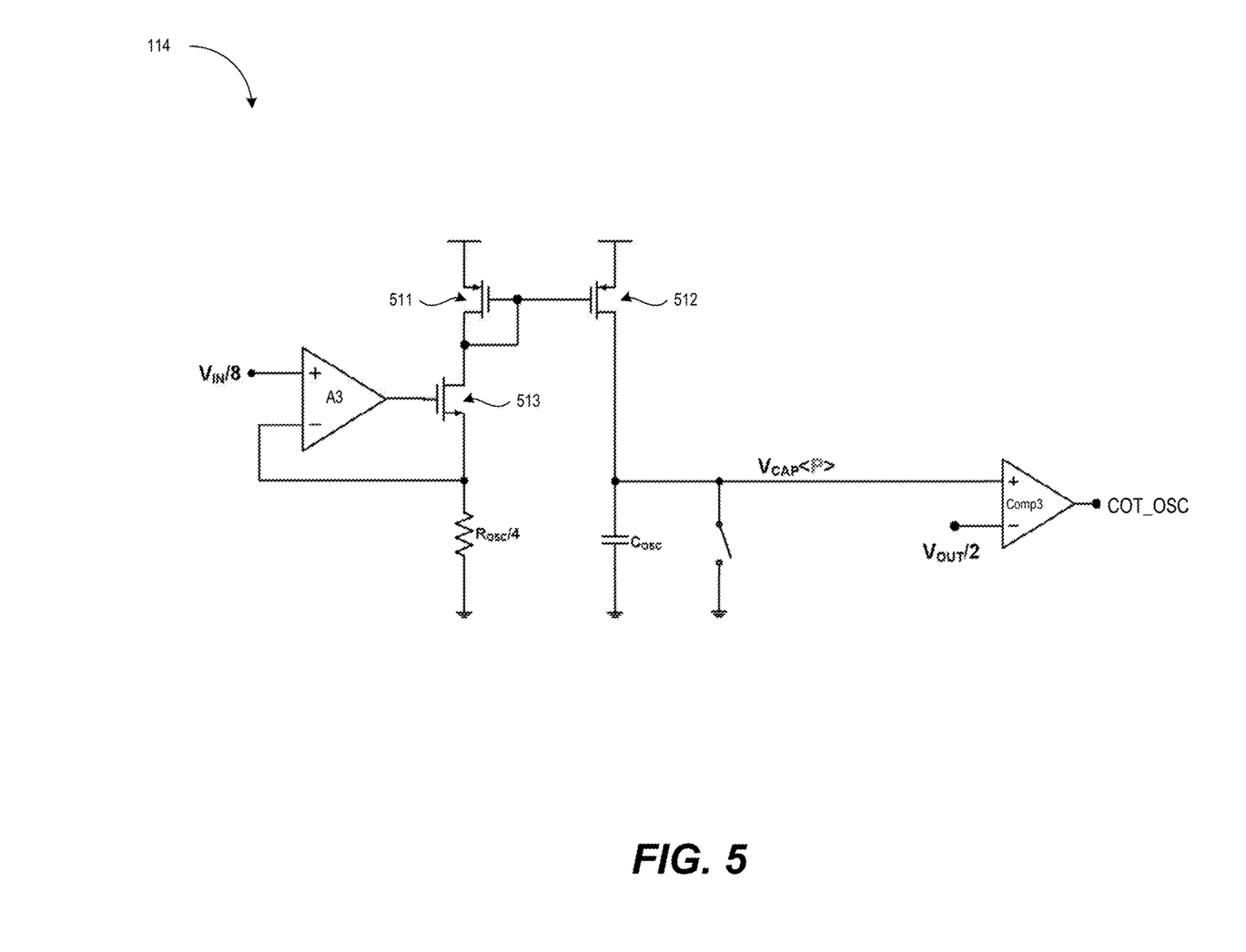
FIG. 5 illustrates a constant-on-time loop of FIG. 1, according to an embodiment.

FIG. 5 illustrates a constant-on-time (COT) loop 114 of FIG. 1, according to an embodiment. The COT loop 114 may represent any one of the COT loops 114A through 114N. COT loop 112 may generate a control signal PWM_OSC (e.g., a signal that may be used to control the duty cycles of the set of power stages 150 illustrated in FIG. 1), as discussed above. The COT loop 112 includes amplifier A3, switches 511, 512, and 513 (e.g., MOSFETs), resistor $R_{OSC}$, capacitor $C_{OSC}$, and a comparison circuit C (e.g., a comparator).

As discussed above, the compensation voltage $V_{COMP}$ is received from amplification circuit 111 of FIG. 1. The switches 311, 312, and 313, resistor $R_{OSC/4}$, and capacitor $C_{OSC}$ are used to generate the voltage $V_{CAP}$. The comparison circuit Comp3 may compare the voltage $V_{CAP}$ with the voltage $V_{OUT/2}$ to generate the COT control signal COT_OSC. $V_{OUT/2}$ may be obtained by dividing the voltage $V_{OUT}$ (from a ramp circuit the output of the apparatus 100) by 2. The control signal COT_OSC may be provided to one of the respective power stages 151A through 151N.

The above descriptions with reference to FIGS. 1-5 only describe some embodiments of the present disclosure. In other embodiments, the any number of power stages may be used in the apparatus (e.g., power converter). For example, the number of power stages may vary based on different requirements or situations where the apparatus 100 is used. In some embodiments, different scheduling may be used by the phase management circuit 113. For example, the phase management circuit 113 may use different scheduling algorithms, functions, etc., to provide a control signal to the different COT loops 114A through 114N. In additional embodiments, different voltages may be used by the amplifiers and comparison circuits of the apparatus 100.

Figure 6:
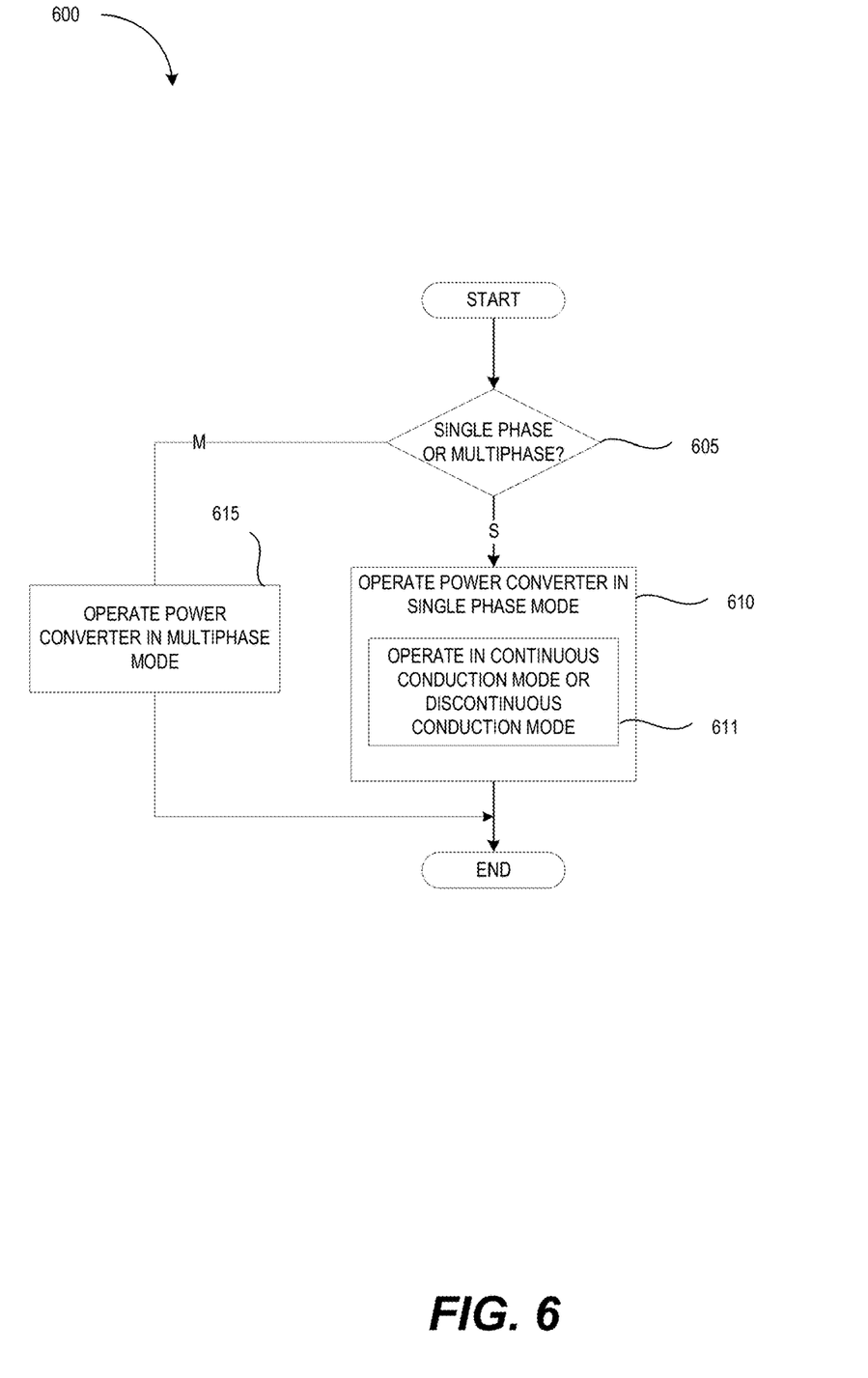
FIG. 6 is a flow diagram of a method for operating a power converting in multiphase mode or single phase mode, according to an embodiment.

FIG. 6 is a flow diagram of a method 600 for operating a power converting in multiphase mode or single phase mode, according to an embodiment. Method 600 may be performed by processing logic that may comprise hardware (e.g., circuitry), software (e.g., instructions running/executing on a processing device), firmware (e.g., microcode), or a combination thereof. In some embodiments, the method 600 may be performed by apparatus 100 (illustrated in FIG. 1) or portions of the apparatus 100 (illustrated in FIGS. 2-5).

As illustrated in FIG. 6, the method 600 starts at block 605 where the method 600 comprises determining whether the apparatus 100 should operate in a single-phase mode or a multi-phase mode. For example, the apparatus 100 may determine whether a signal is received on the select line of the multiplexer circuit 123 indicates that the apparatus 100 should operate in single-phase mode (e.g., a "1" or S) or multi-phase mode (e.g., a "0" or M).

If the signal on the select line of the multiplexer circuit 123 indicates that the apparatus 100 should operate in multi-phase mode, the method 600 comprises operating the power converter in multi-phase mode at block 615. For example, the COT loops 114A through 114N of apparatus 100 may control the operation of the power stages 151A through 151N based on control signals generated by the phase management circuit 113. The power stages 151A through 151N may generate an output voltage based on an input voltage.

If the signal on the select line of the multiplexer circuit 123 indicates that the apparatus 100 should operate in single-phase mode, the method 600 comprises operating the power converter in single-phase mode at block 610. For example, the COT loop 114A may control operation of the power stage 151A based on a control signal generated by the ramp circuit 121 and the comparison circuit 122 of the first stage circuit 120. Only power stage 151 may generate the output voltage based on an input voltage in the single-phase mode. In one embodiment, the method 600 further comprises operating the apparatus 100 in CCM or DCM. For example, based on setting, confirmation, parameter, signal, etc., the apparatus 100 may operate in either CCM or DCM, while operating in single-phase mode.

The above description of illustrated embodiments of the disclosure, including what is described in the Abstract, is not intended to be exhaustive or to limit the disclosure to the precise forms disclosed. While specific embodiments of, and examples for, the disclosure are described herein for illustrative purposes, various equivalent modifications are possible within the scope of the disclosure, as those skilled in the relevant art will recognize. Other embodiments may have layers in different orders, additional layers or fewer layers than the illustrated embodiments.

Various operations are described as multiple discrete operations, in turn, in a manner that is most helpful in understanding the present disclosure, however, the order of description should not be construed to imply that these operations are necessarily order dependent. In particular, these operations need not be performed in the order of presentation.

The terms "over," "above" "under," "between," and "on" as used herein refer to a relative position of one material layer or component with respect to other layers or components. For example, one layer deposited above or over or under another layer may be directly in contact with the other layer or may have one or more intervening layers. Moreover, one layer deposited between two layers may be directly in contact with the two layers or may have one or more intervening layers. In contrast, a first layer "on" a second layer is in direct contact with that second layer. Similarly, unless explicitly stated otherwise, one feature deposited between two features may be in direct contact with the adjacent features or may have one or more intervening layers.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims may generally be construed to mean "one or more" unless specified otherwise or clear from context to be directed to a singular form. Moreover, use of the term "an embodiment" or "one embodiment" or "an embodiment" or "one embodiment" throughout is not intended to mean the same embodiment or embodiment unless described as such. The terms "first," "second," "third," "fourth," etc. as used herein are meant as labels to distinguish among different elements and may not necessarily have an ordinal meaning according to their numerical designation.

What is claimed is:

1. A power converter, comprising:
a plurality of power stages configured to generate an output current that has an output voltage, based on an input current that as an input voltage; and
a control circuit coupled to the plurality of power stages, wherein:
the control circuit is configured to control operation of the plurality of power stages;
the control circuit comprises a plurality of constant-on-time loops for the plurality of power stages; and
the power converter is configured to switch between a single-phase mode and a multiphase mode; and
a first power stage of the plurality of power stages is configured to switch between a continuous conduction mode and a discontinuous conduction mode when the power converter operates in the single-phase mode, wherein:

the control circuit comprises a voltage controlled oscillator loop configured to control the plurality of constant-on-time loops when the power converter operates in the multiphase mode and a first stage circuit configured to control operation of the first power stage, and
the first stage circuit comprising a comparison circuit and a multiplexer circuit, the multiplexer circuit uses a first signal from a phase management circuit when the power converter operates in the multiphase mode and uses a second signal from the comparison circuit when the power converter operates in the single-phase mode.

2. The power converter of claim 1, wherein:
only the first power stage of the plurality of power stages generates the output current when the power converter operates in the single-phase mode; and
the plurality of power stages generates the output current when the power converter operates in the multiphase mode.

3. The power converter of claim 1, wherein:
the control circuit further comprises an amplification circuit; and
the amplification circuit is configured to generate a compensation voltage for the voltage controlled oscillator loop, based on the output voltage of the output current.

4. The power converter of claim 1, wherein:
the phase management circuit is configured to control operation of the plurality of constant-on-time loops for the plurality of power stages.

5. The power converter of claim 1, wherein the control circuit is further configured to control operation of the plurality of power stages based on the output current generated by one or more of the plurality of power stages.

6. The power converter of claim 1, wherein the power converter comprises at least one of a boost converter or a buck converter.

7. The power converter of claim 1, wherein the power converter comprises a direct current to direct current converter.

8. A power converter, comprising:
a means for generating an output current that has an output voltage, based on an input current that has an input voltage;
a means for switching between a single-phase mode and a multiphase mode, configured to use a first signal from a phase management circuit when the power converter operates in the multiphase mode and further configured to use a second signal from a comparison circuit when the power converter operates in the single-phase mode;
a means for generating the output current when the power converter operates in the single-phase mode, configured to switch between a continuous conduction mode and a discontinuous conduction mode when the power converter operates in the single-phase mode;
a means for generating the output current when the power converter operates in the multiphase mode; and
a means for controlling a plurality of constant-on-time loops when the power converter operates in the multiphase mode.

9. The power converter of claim 8, further comprising:
a means for generating a control signal.

10. The power converter of claim 9, further comprising:
a means for generating a compensation voltage based on the output voltage of the output current.

11. The power converter of claim 8, further comprising at least one of:

a means for increasing the output voltage above the input voltage, or a means for decreasing the output voltage below the input voltage.

12. A method, comprising:

determining whether to operate a power converter in a single-phase mode or a multiphase mode, wherein:
  the power converter comprises a plurality of power stages configured to generate an output current based on an input current and a control circuit coupled to the plurality of power stages;
  the control circuit is configured to control operation of the plurality of power stages; and
  the control circuit comprises a plurality of constant-on-time loops for the plurality of power stages; and
in response to determining that the power converter should operate in the single-phase mode, switching the power converter into the single-phase mode to generate the output current using a first stage of the plurality of power stages, wherein the first stage is configured to switch between a continuous conduction mode and a discontinuous conduction mode when the power converter operates in the single-phase mode, wherein:
  the control circuit comprises a voltage controlled oscillator loop configured to control the plurality of constant-on-time loops when the power converter operates in the multiphase mode and a first stage circuit configured to control operation of a first power stage, and
  the first stage circuit comprising a comparison circuit and a multiplexer circuit, the multiplexer circuit uses a first signal from a phase management circuit when the power converter operates in the multiphase mode and uses a second signal from the comparison circuit when the power converter operates in the single-phase mode.

13. The method of claim 12, further comprising:

in response to determining that the power converter should operate in the multiphase mode, generating the output current using the plurality of power stages.

* * * * *